(12) United States Patent
Elahi et al.

(10) Patent No.: US 7,916,672 B2
(45) Date of Patent: Mar. 29, 2011

(54) RF PROCESSOR HAVING INTERNAL CALIBRATION MODE

(75) Inventors: Imtinan Elahi, Richardson, TX (US); Khurram Muhammad, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 705 days.

(21) Appl. No.: 12/017,514

(22) Filed: Jan. 22, 2008

(65) Prior Publication Data

US 2009/0185510 A1 Jul. 23, 2009

(51) Int. Cl.
  H04B 7/00 (2006.01)
  H04B 1/38 (2006.01)
  H04B 1/40 (2006.01)
(52) U.S. Cl. ............... 370/310; 375/219; 455/84
(58) Field of Classification Search .......... 375/219–223, 375/233; 455/78–88, 550.1–562.1; 370/328–345
See application file for complete search history.

(56) References Cited

U.S. PATENT DOCUMENTS

| | | | | |
|---|---|---|---|---|
| 5,978,415 | A * | 11/1999 | Kobayashi et al. | 375/230 |
| 7,248,625 | B2 * | 7/2007 | Chien | 375/219 |
| 7,299,006 | B1 * | 11/2007 | Rofougaran et al. | 455/20 |
| 7,558,556 | B1 * | 7/2009 | Moloudi et al. | 455/323 |
| 7,647,026 | B2 * | 1/2010 | Darabi | 455/67.13 |
| 7,702,362 | B2 * | 4/2010 | Behrens et al. | 455/553.1 |
| 7,783,251 | B2 * | 8/2010 | Rofougaran et al. | 455/20 |
| 2002/0193140 | A1 * | 12/2002 | Behrens et al. | 455/553 |
| 2004/0203472 | A1 * | 10/2004 | Chien | 455/68 |
| 2005/0260949 | A1 | 11/2005 | Kiss et al. | |
| 2007/0217488 | A1 * | 9/2007 | Smaini et al. | 375/219 |
| 2008/0039045 | A1 * | 2/2008 | Filipovic et al. | 455/295 |
| 2008/0045162 | A1 * | 2/2008 | Rofougaran et al. | 455/73 |
| 2008/0205571 | A1 * | 8/2008 | Muhammad et al. | 375/376 |
| 2008/0227409 | A1 * | 9/2008 | Chang et al. | 455/78 |
| 2009/0137213 | A1 * | 5/2009 | Rofougaran et al. | 455/77 |
| 2009/0154377 | A1 * | 6/2009 | Tsuda et al. | 370/277 |
| 2009/0186587 | A1 * | 7/2009 | Sobchak et al. | 455/196.1 |
| 2010/0093298 | A1 * | 4/2010 | Pratt et al. | 455/226.1 |

OTHER PUBLICATIONS

U.S. Appl. No. 12/017,372, Muhammad et al.
Imtinan Elahi et al., IIP2 Calibration by Injecting DC Offset at the Mixer in a Wireless Receiver, IEEE Transactions on Circuits and Systems, 2007.
Imtinan Elahi et al, I/Q Mismatch Compensation Using Adaptive Decorrelation in a Low-IF Receiver in 90-nm CMOS Process, IEEE Journal of Sol.-St. Cir., vol. 41, No. 2, Feb. 6.

* cited by examiner

*Primary Examiner* — Thai D Hoang
(74) *Attorney, Agent, or Firm* — Ronald O. Neerings; Wade James Brady, III; Frederick J. Telecky, Jr.

(57) ABSTRACT

The present invention pertains to a method of calibrating reception properties of a radio frequency (RF) processor. The application describes two embodiments of the invention representing calibration of the properties using an auxiliary transmitter to generate a calibration signal internal to the RF processor.

19 Claims, 8 Drawing Sheets

RF PROCESSOR HAVING INTERNAL CALIBRATION MODE

TECHNICAL FIELD OF THE INVENTION

The present invention generally pertains to communication systems and methods and, more specifically, to calibrating properties of a radio frequency processor.

BACKGROUND OF THE INVENTION

Modern wireless devices, including cellular telephones and Wi-Fi networking devices, require components for transmitting and receiving data simultaneously. Radio frequency (RF) processors have been designed to perform these functions without the need for larger components with greater power requirements. There are many phenomena that degrade the performance of RF processors.

One such phenomenon that degrades performance of an RF processor deals with interference. Specifically, some RF processors are used as full duplex transceivers, i.e., a device that can transmit and receive signals simultaneously. In such devices, RF processors have an inherent problem with self-interference: transmission interferes with reception in a process called transmission leakage even though there should be no overlap between the transmission band and the reception band. Leakage results not only from imperfect duplexer performance in isolating the transmit signal from the reception signal, but also from parasitic coupling paths between multiple elements of the transmission circuitry and the reception circuitry which permit leakage of the transmission signal into the reception signal. Contemporary market pressures push for smaller and smaller transceivers, thus compounding the problem as transmission circuitry is pressed ever closer to reception circuitry.

Another set of phenomena deals with device degradation. Specifically, an RF processor that uses a quadrature amplitude modulation (QAM) scheme may have many properties that can change after factory testing and/or calibration as a result of age, temperature and/or environment. The changes to these properties alter the overall performance of the device. The receiving performance of an RF processor may severely degrade if the change to any one of these properties exceeds certain bounds. Non-limiting examples of such changeable properties include in-phase/quadrature (I/Q) imbalance, the DC offset of RF and analog circuits and the relation of the DC offset to the second-order input intercept point (IIP2) of the processor, gains of RF and analog circuits and the corner frequencies of filters.

In a QAM receiver, the signal being processed is a complex signal including a real part and an (orthogonal) imaginary part. The real part of the complex signal corresponds to the I channel and the imaginary part corresponds to the Q channel. Ideally, in a QAM scheme, the in-phase (I) channel and quadrature (Q) channel carry orthogonal, i.e., non-interfering, channels of information. Because the I channel and Q channel are mixed with orthogonal signals from the local oscillator, and are typically processed through separate circuitry, the signal within the I channel may experience a phase delay that is different than the phase delay experienced by the signal within the Q channel. This difference in phase delay and/or gain between the I and Q channels, or I/Q imbalance, creates unwanted distortion in the received signal.

Amplifiers, mixers, attenuators, and some passive devices can generate intermodulation distortion. These distortion products are a result of a nonlinear transfer characteristic. A common specification, related to distortion, for amplifiers and mixers is the intercept point. If the input versus output of a device is displayed graphically on a dB versus dB scale, the slope of the linear portion will be 1. If second order distortion products are displayed on the same scale they will have a slope of 2, third order distortion products will have a slope of 3, etc. In most cases, distortion products above third order are not important but these rules are still valid. The IIP2 is the point where the linear extension of the second order distortion intersects the linear extension of the input verses output line. In other words the IIP2 is the theoretical input level at which the second-order distortion products are equal in power to the desired signals.

The overall gain of the processor may be defined as the ratio of the peak-to-peak measurement of the output signal to the peak-to-peak measurement of the input signal. The corner frequency of a filter is the transition frequency range between the band of frequencies that can pass through the filter with little impedance, i.e., the pass-band, and the band of frequencies that are greatly attenuated, i.e., the stop-band. Again, as discussed above, both the overall gain and corner frequency of the filter may change after factory testing and/or calibration as a result of age, temperature and/or environment. Unless these changes are accurately determined, compensation or calibration for such changes cannot be maximized.

When manufacturing RF processors, many devices are fabricated on a large disc of semiconductor material. The devices are created to be as uniform as possible, but differences of only a few molecules can significantly alter performance of a single device. Once fabricated, the devices are typically factory tested to verify conformance to specifications. If a device is functional, but does not quite meet standardized performance, it may be a candidate for calibration wherein a calibration signal is used to adjust targeted properties.

Once factory tested and/or calibrated, RF processors are installed into a communication system, for example a cell phone, and are sold. Therefore, factory level calibration cannot account for variation of the performance of the calibrated device due to environmental conditions or degradation over time.

After the RF processor has left the factory, e.g., has been installed into a phone and delivered to a customer, limited conventional post-fabrication calibration methods are available. These limited conventional post-fabrication calibration methods include external calibration signals (delivered to the RF processor) or internal calibration signals (generated by the RF processor). These calibration signals may be used to adjust such properties as I/Q imbalance, the IIP2 of the processor, gains of RF and analog circuits and the corner frequencies of filters within the processor.

Most conventional post-fabrication methods for calibrating RF processors use an external calibration signal, e.g., wherein the phone having the RF processor receives an externally transmitted calibration signal. In cases where an externally transmitted signal is used, the signal must comply with standards designed by government organizations, such as the Federal Communications Commission (FCC), and standards agreed upon by industry groups, such as the United States Telecommunications Industry Association (TIA-USA).

A calibration signal generated and interpreted entirely internal to the RF processor would not be affected by those standards because it would not be transmitted out of the device.

One conventional post-fabrication calibration technique uses an internal calibration signal. This conventional technique transmits the internally generated calibration signal through the main data path transmitter of an RF processor to calibrate the IIP2. This technique has limited use in IIP2 calibration and cannot be used in specific operating conditions because the emitted radiation out of the main transmit path will violate FCC requirements.

What is needed is an RF processor capable of eliminating transmission interference in a reception signal, and of detecting and/or calibrating parameters within the RF processor after factory calibration.

What is additionally needed is an RF processor capable of calibrating more than just the IIP2 with an internal calibration signal after factory calibration.

SUMMARY OF THE INVENTION

The present invention provides a system and method for eliminating transmission interference in a reception signal, and for detecting and/or calibrating parameters within the RF processor after factory calibration.

The present invention additionally provides a system and method for calibrating an RF processor with an internal calibration signal.

One aspect of the present invention is drawn to a RF processor that is operable to improve its performance through interference signal cancellation. Such a RF processor may include a main transmitter portion, an auxiliary transmitter portion and receiver portion. The receiver portion is operable to cancel interference in a received signal caused by a transmitted signal from the main transmitter portion of the RF processor.

Another aspect of the present invention is drawn to a RF processor that is operable to improve its performance by calibrating parameters within the RF processor with an internal calibration signal. An auxiliary transmitter portion of the RF processor may be used to generate an internal calibration signal. A signal processing part of a main receiver portion of the RF processor can use the calibration signal to improve the overall performance of the RF processor.

An RF processor in accordance with an exemplary embodiment of the present invention has two modes of operation. The first mode of operation includes transmitting a signal and improving performance through interference signal cancellation. The second mode of operation does not include transmitting a signal but includes generating an internal calibration signal and improving performance by calibrating parameters within the RF processor with an internal calibration signal.

The second mode of operation may be implemented at predetermined times or by user activation. For example, in a device (such as a cell phone) having an RF processor in accordance with an exemplary embodiment of the present invention, the RF processor may operate in the second mode of operation when the phone is turned on. After the RF processor has been calibrated, it may switch to the first mode of operation. In a device having an RF processor in accordance with another exemplary embodiment of the present invention, the RF processor may operate in the second mode of operation by default, wherein the RF processor operates in the first mode of operation upon transmission or receipt of a signal. In a device having an RF processor in accordance with another exemplary embodiment of the present invention, the RF processor may operate in the second mode of operation upon user activation of a button.

An exemplary embodiment of the present invention includes a device for use with a transmission signal generator, a duplexer and an antenna. The transmission signal generator can generate a transmission signal. The duplexer can provide a transmit signal to the antenna. The antenna can transmit the transmit signal, can receive a reception signal and can provide the reception signal to the duplexer. Further, the duplexer can separate the transmit signal from the reception signal and generate a duplexed signal. The device comprises a first transmitter, a second transmitter and a receiver. The first transmitter can generate an output signal based on the transmission signal. The second transmitter can generate a modifying signal. The receiver has a second order intercept point and can receive a third signal that is based on the modifying signal. The receiver comprises an I channel, a Q channel and a processing portion. The processing portion can calibrate the second order intercept point and can compensate for I/Q imbalance between the I channel and the Q channel.

BRIEF DESCRIPTION OF THE DRAWINGS

A detailed explanation of the operation of the present invention is described with references made to the following set of drawings.

DETAILED DESCRIPTION OF THE INVENTION

The first mode of operation, or the standard mode of operation, of an exemplary RF processor in accordance with the present invention includes a secondary transmitter portion and an auxiliary receiver portion to cancel interference from a main transmitter portion, while the RF processor is transmitting and receiving.

Figure 1:
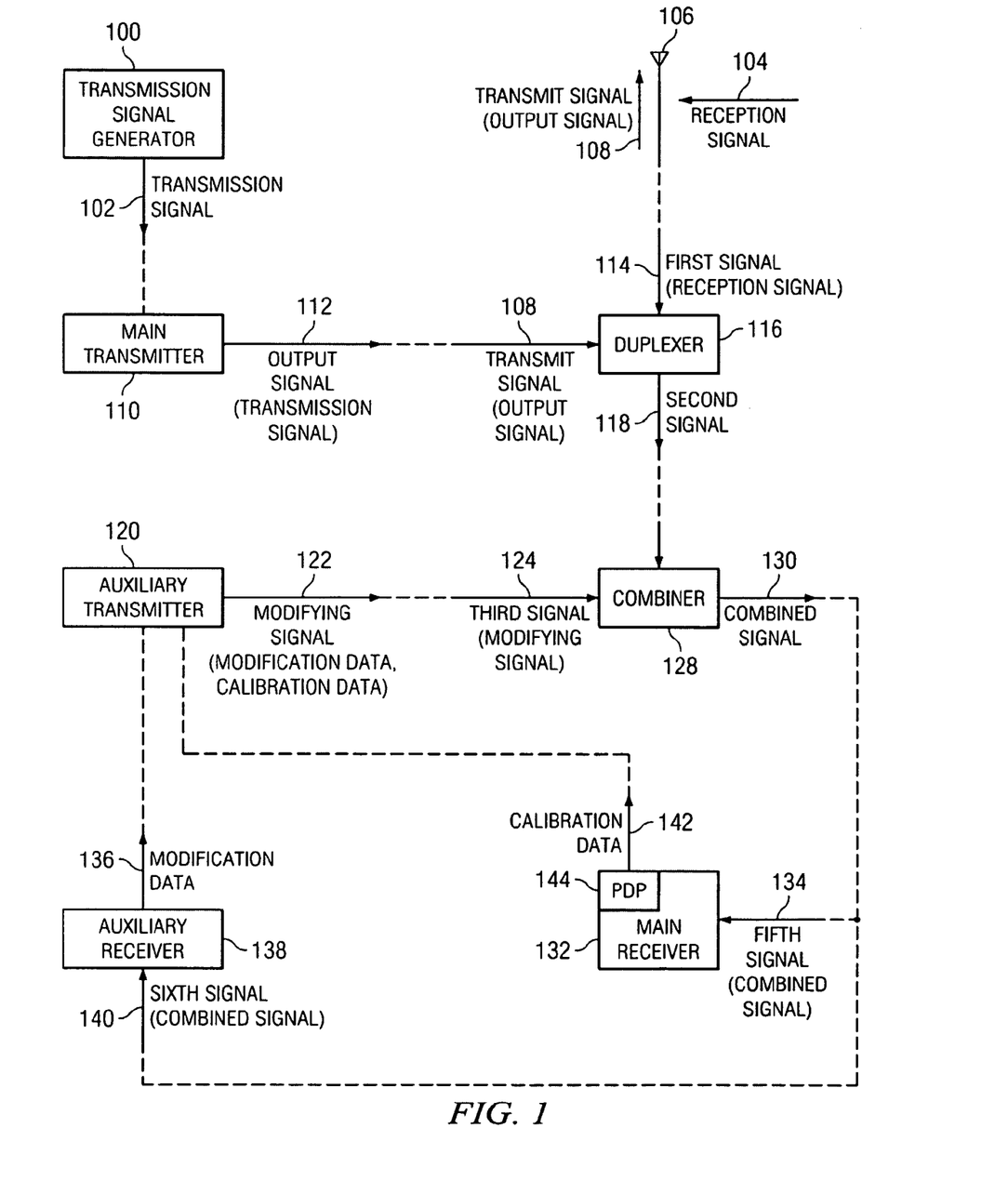
FIG. 1 illustrates an exemplary arrangement of components of the present invention and the signals output and received by those components.
Figure 2:
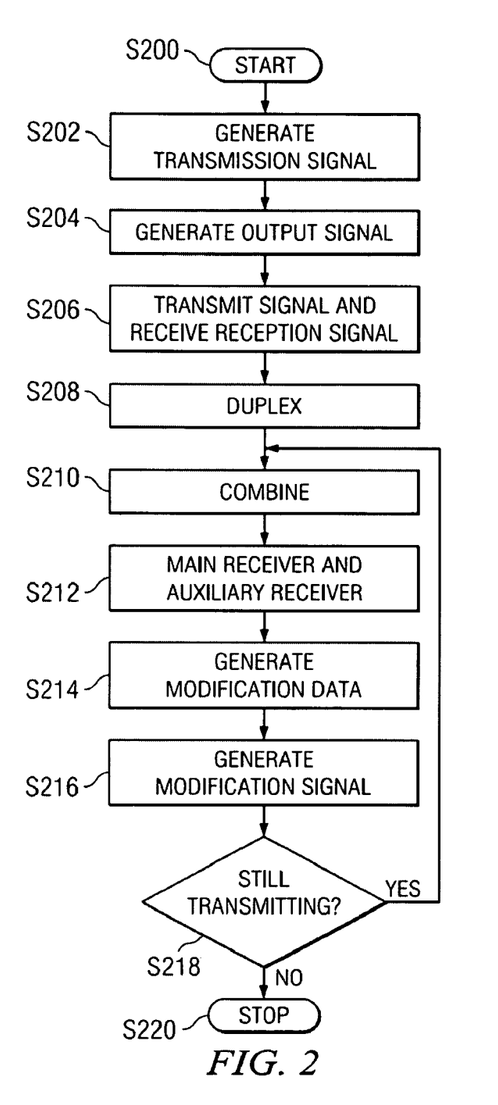
FIG. 2 is a flow chart of the operation of an exemplary RF processor in a transmit and receive mode in accordance with the present invention.

The first mode of operation will now be described with reference to FIG. 1 and FIG. 2.

A transmission signal generator 100 generates a transmission signal 102 to be transmitted S202. Transmission signal generator 100 may be a part of the RF processor or a separate device to be used with the RF processor.

In the next step S204, a main transmitter portion 110 generates output signal 112 based on transmission signal 102. Main transmitter portion 110 may receive transmission signal 102 directly from transmission signal generator 100. Alternatively intermediate circuitry may be included to modify transmission signal 102 somewhat prior to main transmitter portion 110. Non-limiting examples of intermediate circuitry include matching networks, amplifiers, filters, resistors, etc.

Next S206, a transmit signal 108 based on output signal 112 is sent to duplexer 116. Alternatively intermediate circuitry may be included to modify output signal 112 somewhat prior to duplexer 116.

Duplexer 116 then sends the transmit signal 108 to antenna 106. Antenna 106 may receive transmit signal 108 directly from duplexer 116. Alternatively, intermediate circuitry may be included to modify transmit signal 108 somewhat prior to antenna 106.

A reception signal 104 is additionally received by antenna 106.

Then S208, duplexer 116 receives transmit signal 108 and a first signal 114 based on reception signal 104 and separates the two signals into a second signal 118. Duplexer 116 may receive first signal 114 directly from antenna 106. Alternatively, intermediate circuitry may be included to modify first signal 114 somewhat prior to duplexer 116.

Ideally, duplexer 116 completely separates transmit signal 108 and a first signal 114 to produce a second signal 118. However, there is parasitic coupling wherein a portion of the transmit signal 108 is leaked into the first signal 114 and therefore is retained in second signal 118. This transmission signal leakage is interference.

A fourth signal 126 based on the second signal 118 is sent (S210) to a combiner portion 128. Fourth signal 126 includes the additional transmission signal leakage. Fourth signal 126 is combined with a third signal 124 based on a modifying signal 122 to create combined signal 130. Combiner portion 128 may receive second signal 118 directly from duplexer 116 and modifying signal 122 directly from an auxiliary transmitter portion 120. Alternatively, intermediate circuitry may be included to modify second signal 118 and modifying signal 122 somewhat prior to combiner portion 128.

Next (S212), a fifth signal 134 based on combined signal 130 is sent to main receiver portion 132 and a sixth signal 140 also based on combined signal 130 is sent to auxiliary receiver portion 138. Main receiver portion 132 may receive combined signal 130 directly from combiner portion 128. Alternatively, intermediate circuitry may be included to modify combined signal 130 somewhat prior to main receiver portion 132. Auxiliary receiver portion 138 may additionally receive combined signal 130 directly from combiner portion 128. Alternatively, intermediate circuitry may be included to modify combined signal 130 somewhat prior to auxiliary receiver portion 138. In one embodiment, fifth signal 134 and sixth signal 140 are the same and are passed to main receiver 832 and auxiliary receiver portion 138 and are modified or modified by the same set of intermediate circuitry. In another embodiment, as above, fifth signal 134 and sixth signal 140 are separately modified by different intermediate circuitry.

Auxiliary receiver portion 138 uses sixth signal 140 to create modification data 136 (S214) to ultimately cancel interference in second signal 118 caused by transmit signal 108. Specifically, modification data 136 is used by auxiliary transmitter portion 120 to create (S216) a modification signal 122. If the RF processor is still transmitting (S218), the process returns to step S210 to continue to cancel interference in the second signal 118.

A portion of modification signal 122 is an inverse of the interference, so that when third signal 124 based on modification signal 122 is combined with fourth signal 126 by combiner portion 128, modification signal 122 destructively interferes with and cancels out at least some of the received interference within fourth signal 126. An exemplary working embodiment of the first mode of operation of an RF processor discussed above is disclosed in the commonly owned U.S. patent application Ser. No. 12/017,372 by the present inventors, filed on Jan. 22, 2008, and titled "SYSTEM AND METHOD FOR TRANSMISSION INTERFERENCE CANCELLATION IN FULL DUPLEX TRANSCEIVER," the entire disclosure of which is incorporated herein by reference.

The second mode of operation of an exemplary RF processor in accordance with the present invention uses an auxiliary transmitter portion to calibrate parameters of the RF processor to compensate for performance variation caused by environmental conditions, are of the device, or other causes of performance degradation.

The second mode of operation may be implemented at predetermined times or by user activation as known to those of skill in the art. For example, in a device (such as a cell phone) having an RF processor in accordance with an exemplary embodiment of the present invention, the RF processor may operate in the second mode of operation when the phone is turned on. After the RF processor has been calibrated, it may switch to the first mode of operation. In a device having an RF processor in accordance with another exemplary embodiment of the present invention, the RF processor may operate in the second mode of operation by default, wherein the RF processor operates in the first mode of operation upon transmission or receipt of a signal. In a device having an RF processor in accordance with another exemplary embodiment of the present invention, the RF processor may operate in the second mode of operation upon user activation of a button. Each of these embodiments of implementing the second mode of operation may be utilized by any manner known to those of skill in the art.

Figure 3:
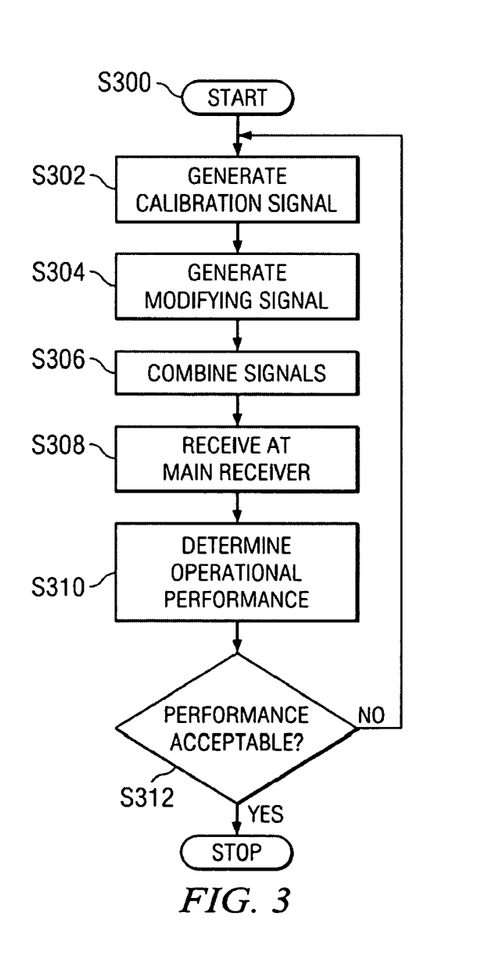
FIG. 3 is a flow chart of operation of an exemplary RF processor in a second mode in accordance with the present invention.

The second mode of operation will now be described with reference to FIG. 1 and FIG. 3.

First (S302), performance determining portion 144 of main receiver portion 132 generates calibration data 142 based on the current properties of the digital RF processor. These properties may be measured or monitored in any known manner. Auxiliary transmitter portion 120 uses calibration data 142 to generate a modifying signal 122 (S304).

Next (S306), third signal 124 and fourth signal 126 are sent to combiner portion 128 to create a combined signal 130. Fourth signal 126 may be a null signal carrying no information to allow for combined signal 130 to be a duplicate of third signal 124. Alternatively, fourth signal 126 may contain received information passed as reception signal 104 through antenna 106.

Then (S308), fifth signal 134 based on combined signal 130 is received by main receiver portion 132. Performance determining portion 144 determines the operational performance of the RF processor (S310). If the operational performance is found to be unacceptable (S312), the process returns to step S302 to continue to adjust the properties of the RF processor until the operational performance of the device is determined to be acceptable.

In the first mode of operation, main transmitter portion 110 transmits output for the RF processor and auxiliary transmitter portion 120 generates an interference canceling modification signal 122 using modification data 136. Also in the first mode of operation, auxiliary receiver portion 138 generates modification data 136 and main receiver portion 132 interprets the reception signal 104.

In the second mode of operation, main transmitter portion 110 transmits a relatively low-power transmit signal, or even transmits no transmit signal, while auxiliary transmitter portion 120 generates a calibrating modification signal 122 using calibration data 142. Also in the second mode of operation, main receiver portion 132 configures the calibration values of the RF processor using performance determining portion 144.

The following description details two exemplary embodiments of the present invention and two modes of operation of each embodiment.

One exemplary embodiment of the present invention includes a Cartesian transmitter portion as the main transmitter portion of an RF processor. This embodiment will now be described in greater detail with respect to FIGS. 4, 5, 6, and 7A-B.

To describe the operation of this embodiment, it is best to begin by describing a first mode of operation for the RF processor.

Figure 4:
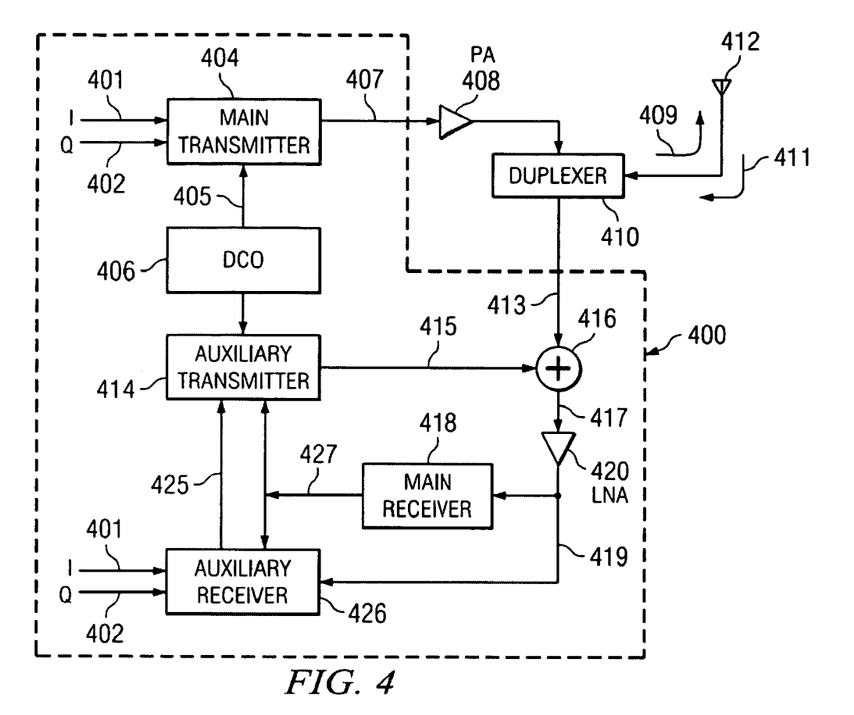
FIG. 4 illustrates an exemplary RF processor in accordance with one embodiment of the present invention.

An exemplary RF processor in accordance with this embodiment is shown in FIG. 4. In a first mode of operation, RF processor 400 is a full duplex transceiver and thus is capable of transmitting and receiving data simultaneously using antenna 412. For simplicity of explanation, the transmit operation of RF processor 400 will be described first.

RF processor 400 includes a main Cartesian transmitter portion 404, an auxiliary Cartesian transmitter portion 414, a digitally controlled oscillator (DCO) portion 406, an input combiner portion 416, a low noise amplifier (LNA) portion 420, a main receiver portion 418, and an auxiliary receiver portion 426. In this embodiment, a power amplifier 408, an antenna 412, and a duplexer 410 are distinct from RF processor 400. However, in other embodiments, at least one of power amplifier 408, antenna 412, and duplexer 410 may be included in RF processor 400.

Main transmitter portion 404 receives as input, I component 401 and Q component 402 of the data to be transmitted as well as sine and cosine carrier waves 405 having a frequency corresponding to the output frequency of RF processor 400, which are generated by DCO portion 406.

Figure 5:
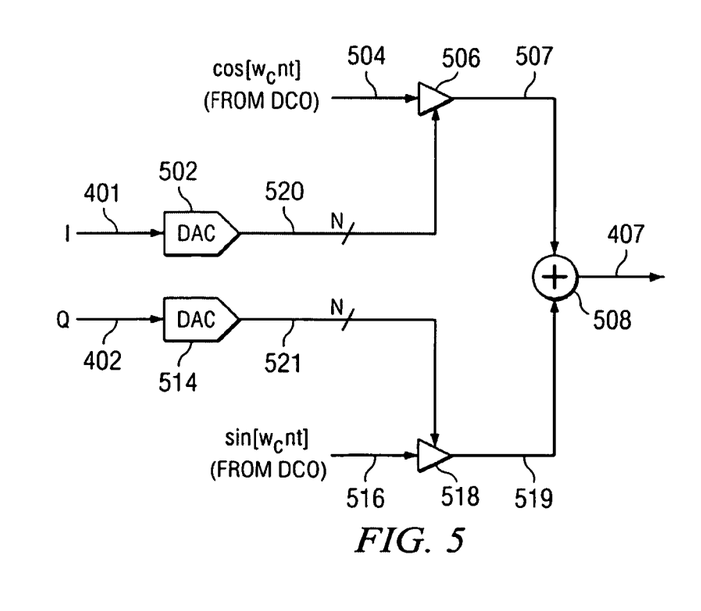
FIG. 5 illustrates an exemplary embodiment of a Cartesian transmitter portion as used as the main transmitter portion of the RF processor in FIG. 4.

FIG. 5 illustrates an exemplary embodiment of main transmitter portion 404 in accordance with the present invention. As illustrated in FIG. 5, main transmitter portion 404 includes digital-to-analog converters (DACs) 502 and 514, pre-power amplifiers (PPAs) 506 and 518, and combiner 508.

I component 401 of the data to be transmitted is converted from digital to analog by digital-to-analog converter (DAC) 502. Object 520 represents multiple signal lines going from DAC 502 to pre-power amplifier (PPA) 506. The analog output from DAC 502 is converted to the output frequency of RF processor 400 by PPA 506 by mixing with cosine carrier wave 504 from DCO portion 406. The output from PPA 506 is the I component 507 of the output signal of RF processor 400 and is sent to combiner 508.

Q component 402 of the data to be transmitted is converted from digital to analog by DAC 514. Object 521 represents multiple signal lines going from DAC 514 to PPA 518. The analog output from DAC 514 is converted to the output frequency of RF processor 400 by PPA 518 by mixing with sine carrier wave 516 from DCO portion 406. The output from PPA 518 is the Q component 519 of the output signal of RF processor 400 and is sent to combiner 508 to be combined with I component 507.

The I component 507 and Q component 519 of the output signal are combined to form a single output signal 407 by combiner 508, which is then used as the output of RF processor 400.

Returning to FIG. 4, output signal 407 is output to powered amplifier 408, which increases the power of output signal 407 before being sent to duplexer 410. Duplexer 410 then sends amplified output signal 409 to antenna 412 for transmission.

In the event that the amplified output signal 409 is sent through antenna 412 while an input signal 411 is received through antenna 412, duplexer 410 separates amplified output signal 409 from input signal 411. Cartesian transmitter portion 414 initially generates signal 415 as a zero signal, but will change the signal as described in more detail below. Input signal 411, is combined with a signal 415 by input combiner portion 416. The combined signal 417 output by input combiner portion 416 is amplified by LNA portion 420 and the combined amplified signal 419 is sent to main receiver portion 418 and auxiliary receiver portion 426.

Figure 6:
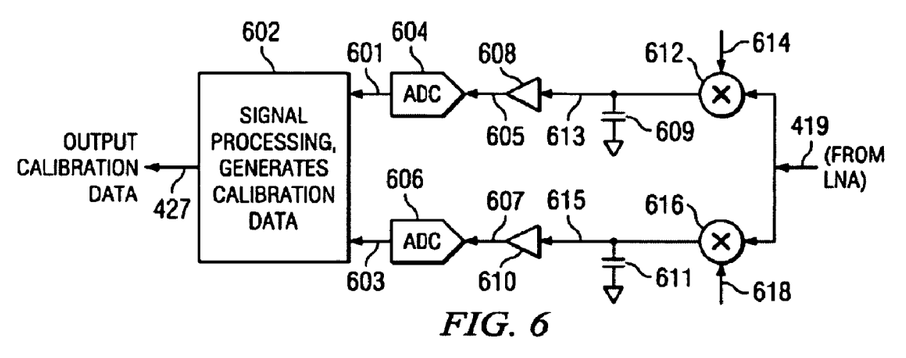
FIG. 6 illustrates an exemplary embodiment of a main receiver portion as used by the RF processor shown in FIG. 4 and FIG. 8

Combined amplified signal 419 is then processed by main receiver portion 418 as shown in FIG. 6. As illustrated in FIG. 6, main receiver portion 418 includes signal processing unit 602, analog-to-digital converters (ADCs) 604 and 606, amplifiers 608 and 610, low-pass filters 609 and 611, and mixers 612 and 616.

Combined amplified signal 419 is sent to mixers 612, 616 to be separated into I component 613 and Q component 615. I component 613 is separated from combined amplified signal 419 by mixing combined amplified signal 419 with I carrier wave 614. Separated I component 613 is filtered by low-pass filter 609 and is amplified by amplifier 608 to improve the digital output for the following analog-to-digital converter (ADC) 604. Amplified I component 605 is converted to digital data by ADC 604, and is then sent to signal-processing unit 602.

Q component 615 is separated from combined amplified signal 419 by mixing combined amplified signal 419 with Q carrier wave 618. Separated Q component 615 is filtered by low-pass filter 611 and is amplified by amplifier 610 to improve the digital output for the following ADC 606. Amplified Q component 607 is converted to digital data by ADC 606, and is then sent to signal-processing unit 602. Signal-processing unit 602 processes I signal 601 and Q signal 603 to interpret the received data.

Returning to FIG. 4, in the first mode of operation of RF processor 400, amplified output signal 409 is strong enough to make complete separation of amplified output signal 409 and received signal 411 by duplexer 410 very difficult. As a result, some of amplified output signal 409 bleeds through duplexer 410 as interference in received signal 411. To cancel the interference from amplified output signal 409, auxiliary receiver portion 426 compares combined amplified signal 419 to I component 401 and Q component 402 of the data to be transmitted. Auxiliary receiver portion 426 then provides data 425 to auxiliary Cartesian transmitter portion 414 in order to create signal 415, which in this mode of operation is an interference-canceling signal. Auxiliary Cartesian transmitter portion 414 outputs interference-canceling signal 415 to input combiner portion 416. Input combiner portion 416 mixes interference-canceling signal 415 with signal 413 from duplexer 410 to compensate for the interference from output signal 409 that is passed through duplexer 410 into signal 413.

The operation of auxiliary receiver portion 426 and auxiliary Cartesian transmitter portion 414 to cancel the interference from amplified output signal 409 in the received signal 411 will now be described with reference to FIG. 7A.

Figure 7A:
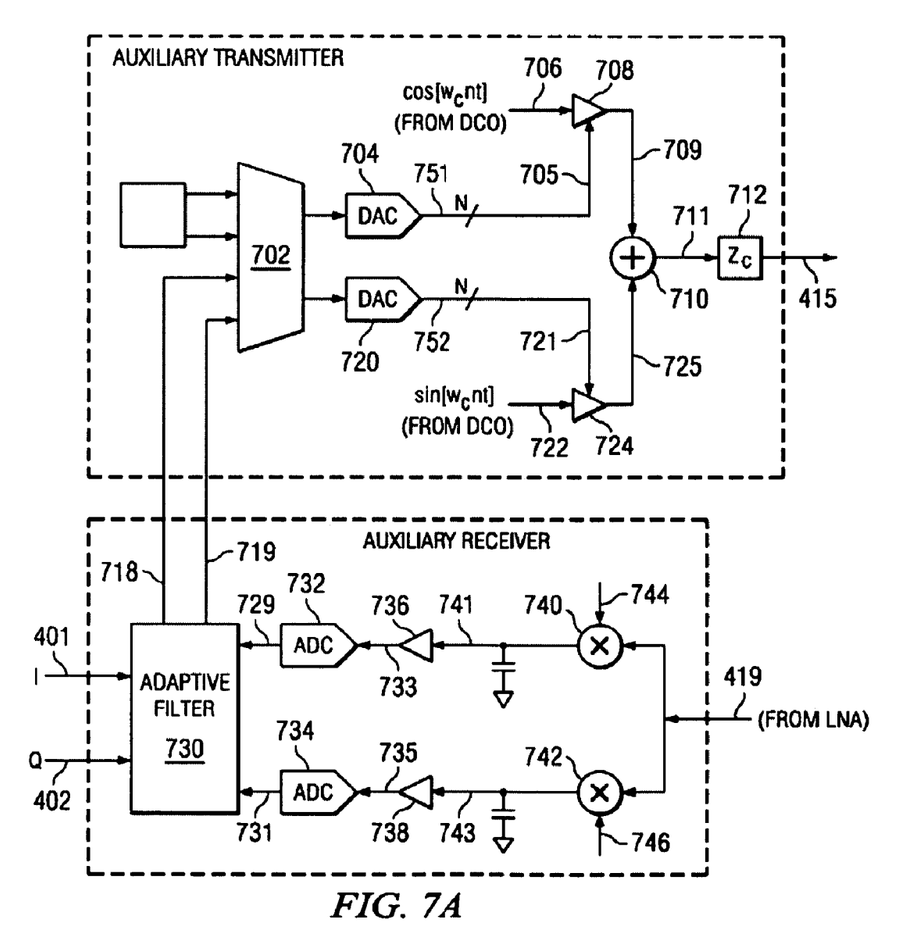
FIG. 7A illustrates a first mode of operation of the RF processor in FIG. 4.

As illustrated in FIG. 7A, auxiliary receiver portion 426 includes adaptive filter 730, ADCs 732 and 734, amplifiers 736 and 738, low-pass filters 737 and 739, and mixers 740 and 742. Further, auxiliary Cartesian transmitter portion 414 includes multiplexer 702, DACs 704 and 720, PPAs 708 and 724, mixer 711, and coupling impedance 712.

Combined amplified signal 419 is sent to mixers 740, 742 to be separated into I component 741 and Q component 713. I component 741 is separated from combined amplified signal 419 by mixing combined amplified signal 419 with I carrier wave 744. Separated I component 741 is filtered by low-pass filter 737 and is amplified by amplifier 736 to improve the digital output for the following ADC 732. Amplified I component 733 is converted to digital data by ADC 732, and is then sent to an adaptive filter 730.

Q component 743 is separated from combined amplified signal 419 by mixing combined amplified signal 419 with Q carrier wave 746. Separated Q component 743 is filtered by low-pass filter 739 and is amplified by amplifier 738 to improve the digital output for the following ADC 734. Amplified Q component 735 is converted to digital data by ADC 734, and is then sent to adaptive filter 730.

Adaptive filter 730 compares I signal 729 to I component 401 of the data to be transmitted and compares Q signal 731 to Q component 402 of the data to be transmitted. Adaptive filter 730 then generates I data 718 and Q data 719, which auxiliary Cartesian transmitter portion 414 uses to create interference-canceling signal 415 to cancel interference from amplified output signal 409.

I data 718 and Q data 719 are output to multiplexer 702. In this mode of operation, multiplexer 702 sends I data 718 to DAC 704, which converts I data 718 to analog signal 705. Object 751 represents a signal having a predetermined N-bit amplitude going from DAC 704 to pre-power amplifier (PPA) 708. Analog signal 705 is converted to the output frequency of RF processor 400 by PPA 708 by mixing with cosine carrier wave 706 from DCO portion 406. The output 709 from PPA 708 is the I component of the interference-canceling signal and is sent to a combiner 710.

In this mode of operation, multiplexer 702 additionally sends Q data 719 to DAC 720, which converts Q data 719 to analog signal 721. Object 752 represents a signal having a predetermined N-bit amplitude going from DAC 720 to PPA 724. Analog signal 721 is converted to the output frequency of RF processor 400 by PPA 724 by mixing with sine carrier wave 722 from DCO portion 406. The output 725 from PPA 724 is the Q component of the interference-canceling signal and is sent to combiner 710 to be combined with I component 709.

I component 709 and Q component 725 are combined by combiner 710 to create interference-canceling signal 711, which is then passed through coupling impedance 712 before being sent as interference-canceling signal 415 to input combiner portion 416.

In the first mode of operation of RF processor 400, amplified output signal 409 is transmitted through antenna 412 while input signal 411 is received through antenna 412. In this first mode of operation, auxiliary receiver portion 426 and auxiliary Cartesian transmitter portion 414 generate interference-canceling signal 415 to cancel interference in received signal 411 caused by amplified output signal 409.

The second mode of operation of RF processor 400 will now be described.

In a second mode of operation, characteristics of RF processor 400, including I/Q imbalance, the IIP2 of the RF processor 400, gains within RF processor 400 and the corner frequencies of filters within RF processor 400, can be detected and/or calibrated with an internally generated signal.

Operation of exemplary auxiliary receiver portion 426 and auxiliary Cartesian transmitter portion 414 in the second mode will now be described with reference to FIG. 7B.

Figure 7B:
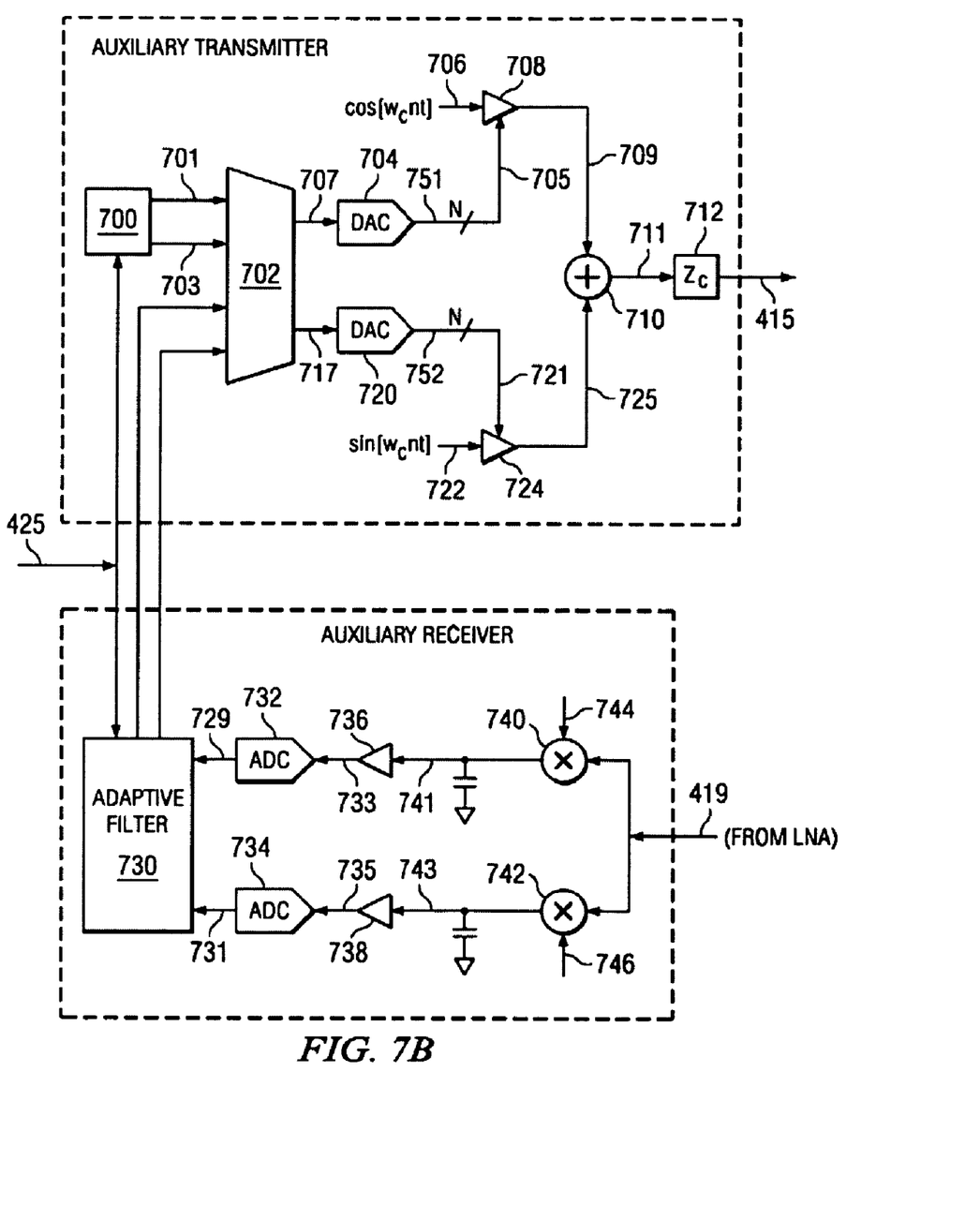
FIG. 7B illustrates a second mode of operation of the RF processor in FIG. 4.

In addition to the components of auxiliary receiver portion 426 and auxiliary Cartesian transmitter portion 414 as described above in reference to FIG. 7A, the discussion of FIG. 7B adds calibration signal control unit 700 when discussing auxiliary Cartesian transmitter portion 414.

Calibration signal control unit 700 generates an I calibration signal 701 and a Q calibration signal 703, and signals 701 and 703 are output to multiplexer 702. In this mode of operation, multiplexer 702 outputs signal 701 as I calibration signal component 707 and signal 703 as Q calibration signal component 717.

I calibration signal component 707 is converted to analog signal 705 by DAC 704. Object 751 represents a signal having a predetermined N-bit amplitude going from DAC 704 to PPA 708. Analog signal 705 is converted to the output frequency of RF processor 400 by PPA 708 by mixing with cosine carrier wave 706 from DCO portion 406. The output 709 is the I component of the calibration signal and is sent to combiner 710.

Q calibration signal component 717 is converted to analog signal 717 by DAC 720. Object 752 represents a signal having a predetermined N-bit amplitude going from DAC 720 to PPA 724. Analog signal 717 is converted to the output frequency of RF processor 400 by PPA 724 by mixing with sine carrier wave 722 from DCO portion 406. The output 725 is the Q component of the calibration signal and is sent to combiner 710 to be combined with the I component 709.

Signal 709 and signal 725 are combined by combiner 710 to create calibration signal 711, which is then passed through coupling impedance 712 before being sent as output 415 to input combiner portion 416.

Returning to FIG. 4, in the second mode of operation, signal 415 is a calibration signal. In this mode of operation, main transmitter portion 404 transmits a relatively low-power transmit signal, or even transmits no transmit signal. Auxiliary Cartesian transmitter portion 414 sends calibration signal 415 to input combiner portion 416 to be mixed with a blank receive signal 413. Combined signal 417 is then transmitted through LNA portion 420 before being sent as combined amplified signal 419 to auxiliary receiver portion 426 and main receiver portion 418.

The processing of a calibration signal by main receiver portion 418 will now be described with reference to FIG. 6. Combined amplified signal 419 is sent to mixers 612, 616 to be separated into I component 613 and Q component 615. I component 613 is separated from combined amplified signal 419 by mixing combined amplified signal 419 with I carrier wave 614. Separated I component 613 is filtered by low-pass filter 609 and is amplified by amplifier 608 to improve the digital output for the following ADC 606. Amplified I component 605 is converted to digital data by ADC 604, and is then sent to signal-processing unit 602.

Q component 61.5 is separated from combined amplified signal 419 by mixing combined amplified signal 419 with Q carrier wave 618. Separated Q component 615 is filtered by low-pass filter 611 and is amplified by amplifier 610 to improve the digital output for the following ADC 606. Amplified Q component 607 is converted to digital data by ADC 606, and is then sent to signal-processing unit 602.

Signal-processing unit 602 processes the I signal 601 and Q signal 603 to, inter alia: 1) detect overall gain of main receiver portion 418; 2) detect corner frequencies of the filters of main receiver portion 418; 3) adjust the DC offset for IIP2 calibration; and/or 4) compensate for I/Q imbalance.

Exemplary methods of: 1) detecting overall gain of main receiver portion 418; 2) detecting corner frequencies of the filters of main receiver portion 418; 3) adjusting the DC offset for IIP2 calibration; and 4) compensating for I/Q imbalance, all with the use of an internally generated signal, will now be described.

An exemplary method for detecting the overall gain of main receiver portion 418, will now be described.

To detect the overall gain of main receiver portion 418, calibration signal control unit 700 of auxiliary transmitter portion 414 generates a CW signal The CW signal is provided to main receiver portion 418 via input combiner portion 416 and LNA portion 420. The input signal strength at main receiver portion 418 and output signal strength from main receiver portion 418 are measured by signal processing unit 602. The overall gain of main receiver portion 418 is then computed by signal processing unit 602. It should be noted that the gain of any amplifier or set of amplifiers within RF processor 400 may be measured in this manner, so long as signal processing unit is operable to receive the appropriate input signal and output signal measurements. Further, the gain of an amplifier or set of amplifiers may be frequency dependent. Accordingly, calibration signal control unit 700 may output a plurality of CW signals having different frequencies within the reception band of RF processor 400. Each one of these different frequency signals may then be used to determine gain of an amplifier or set of amplifiers as a function of frequency.

In an exemplary embodiment, after the overall gain of main receiver portion 418 is detected, signal processing unit 602 may adjust the gain with an automatic gain control (AGC) circuit, as known to those of skill in the art. In particular, if the overall gain of main receiver portion 418 had changed from when it was factory tested, as a result of age, temperature and/or environment, the AGC of signal processing unit 602 may increase or decrease the gain back to its factory specification. It should be noted that the gain of any amplifier or set of amplifiers within RF processor 400 may be adjusted in this manner, so long as signal processing unit is in appropriate electrical communication with such amplifiers or set of amplifiers.

As discussed above, the novel feature of the present invention is the use of the internal calibration signal. Specifically, the CW signal provided by calibration signal control unit 700 of auxiliary transmitter portion 414 is generated within RF processor 400 and is not transmitted from RF processor 400. This distinguishes over conventional gain detection systems in RF processors that use external signals that are transmitted from the device or transmitted to the device, which are then subject compliance with standards designed by government organizations, such as the Federal Communications Commission (FCC), and standards agreed upon by industry groups, such as the United States Telecommunications Industry Association (TIA-USA).

Next, an exemplary method of detecting corner frequencies in accordance with the present invention will be described.

For the sake of this discussion, only the low-pass corner frequency will be described, even though any corner frequency may be determined as known by those of skill in the art. In an exemplary method of detecting the corner frequency of main receiver portion 418, calibration signal control unit 700 of auxiliary transmitter portion 414 generates a CW signal at the factory-set corner frequency $f_o$ of main receiver portion 418. The CW signal is provided to main receiver portion 418 via input combiner portion 416 and LNA portion 420. The output signal strength from main receiver portion 418 at $f_o$ is measured by signal processing unit 602. Calibration signal control unit 700 generates a CW signal at a frequency $f_c$ that is offset from $f_o$ by the amount corresponding to the factory-tested 3 db attenuation point. The corresponding output signal strength for the CW at $f_c$ from main receiver portion 418 is measured by signal processing unit 602.

If the output signal strength of the CW $f_c$ is equal to the 3 db attenuation of the output signal strength from main receiver portion 418 at $f_o$, then the factory tested corner frequency has not changed. However, if the output signal strength of the CW $f_c$ is not equal to the 3 db attenuation of the output signal strength from main receiver portion 418 at $f_o$ then the factory tested corner frequency has changed, for example as a result of age, temperature and/or environment. In such a case, calibration signal control unit 700 may generate additional signals for measurement by signal processing unit 602 to determine that accurate corner frequency.

It should be noted that the corner frequency of any filter or set of filters may be measured in this manner, so long as signal processing unit is in appropriate electrical communication with such filter or set of filters.

As discussed above, the novel feature of the present invention is the use of the internal calibration signal. Specifically, the CW signal provided by calibration signal control unit 700 of auxiliary transmitter portion 414 is generated within RF processor 400 and is not transmitted from RF processor 400. This distinguishes over conventional corner frequency detection systems in RF processors that use external signals that are transmitted from the device or transmitted to the device, which are then subject compliance with standards designed by government organizations, such as the Federal Communications Commission (FCC), and standards agreed upon by industry groups, such as the United States Telecommunications Industry Association (TIA-USA).

An exemplary method of calibrating IIP2 in accordance with the present invention will be described.

When a strong continuous wave (CW) interferer signal is input into receiver portion 418, the second order distortion introduces a DC offset at the output of mixer 612 and a DC offset at the output of mixer 616. If the IIP2 is high, then a change in the DC offset due to IIP2 is small and vice versa. It is also known that the IIP2 of a receiver depends on the DC offset at the mixer, as disclosed by Elahi et al., *IIP2 Calibration by Injecting DC Offset at the Mixer in a Wireless Receiver*, IEEE Transactions on Circuits and Systems, 2007. By appropriately setting the mixer DC-offset, an optimum value of IIP2 can be achieved. Therefore, the mixer DC offset that generates the smallest change in the DC offset corresponds to the highest IIP2. Based on this observation, IIP2 may be calibrated in the following manner.

First the receiver portion is set to a predetermined initial condition and, without any CW interferer signal being applied, a first DC offset from signal 601 and a first DC offset from signal 603 are measured by signal-processing unit 602. Then, a strong CW signal is internally applied by calibration signal control unit 700 at an offset frequency from the carrier frequency. A second DC offset from signal 601 and a second DC offset from signal 603 are measured by signal processing unit 602. The change in the complex DC offset is computed by adding the change in the I component with the change in the Q component, $\Delta DC_I^2 + \Delta DC_Q^2$. This process is repeated a plurality of times, wherein a new DC offset is applied at mixer 61.2 and mixer 616. The best IIP2 corresponds to the DC offset that generates the smallest value of $\Delta DC_I^2 + \Delta DC_Q^2$. The optimal DC offset for signal 601 and signal 603 corresponds to the best IIP2 state. This DC offset is then applied to signals 601 and 601 to maintain the best IIP2 state.

Further, the IIP2 state may be further optimized by applying different DC offsets to each of signals 601 and 603. Specifically, a first DC offset at mixer 612 that generates the smallest value of $\Delta DC_I^2$ may be applied to signal 601, whereas, a second DC offset at mixer 616 that generates the smallest value of $\Delta DC_Q^2$ may be applied to signal 603. Application of the correct DC offset at each of signals 601 and 603 thus calibrates IIP2.

Next, exemplary methods of compensating for I/Q mismatch in accordance with the present invention will be described.

There are two commonly used conventional methods for improving I/Q mismatch. The first method includes receiving externally provided CW test tones to find gain and phase imbalance between I and Q and then to make adjustments to compensate accordingly. The second method includes receiving an externally provided signal and compensating for the gain and phase imbalance using an adaptive filter. Please see Elahi et al., *I/Q Mismatch Compensation Using Adaptive Decorrelation in a Low-IF Receiver in 90-nm CMOS Process*, IEEE Journal of Solid-Sate Circuits, VOL. 41, NO. 2, Feb. 2006.

Exemplary methods for improving I/Q mismatch in accordance with the present invention differ from the conventional methods discussed above in that the present invention uses an internally generated CW signal. The first method in accordance with the present invention will therefore not be further described.

With respect to the second method, returning to FIG. 7A, it should be noted that adaptive filter 730 of auxiliary receiver portion 426 starts with an initial value (e.g., all zeros). It takes a certain amount of time, called the convergence time, for adaptive filter 730 to get trained to the right set of filter taps for compensation. An "online convergence" is when convergence time is determined using a received signal, whereas an off-line convergence is when convergence time is determined using a factory applied signal. Online convergence suffers from performance degradation because the externally provided signal level can vary significantly and there can be strong interferers. Accordingly, it is generally better to perform an off-line calibration of adaptive filter 730 using a CW signal of a predetermined amplitude and frequency. Calibration signal control unit 700 provides this CW signal of a predetermined amplitude and frequency, thus resulting in a better set of initial filter taps and much superior performance compared with the case where the filter taps start off from an arbitrary initial value (all zeros, e.g.).

If needed, the I/Q mismatch can be further improved by performing a slow online adaptation using adaptive filter 730 on an actual received signal during the first mode of operation of RF processor 400.

Clearly, as discussed above, in all methods of I/Q imbalance correction, an internally generated CW signal is very useful.

As discussed above, in the second mode of operation of RF processor 400, signal 415 is a calibration signal that is internally generated by auxiliary Cartesian transmitter portion 414 and is used to measure and/or calibrate properties of RF processor 400 to improve the quality of received data interpreted by main receiver portion 418. This mode is designed to account for the variation in the performance of the device due to environmental conditions such as temperature and variation in the performance of the device due to the age or extended use of the device. The internally generated calibration signal 415 is used as a reference for the main receiver portion to adjust RF processor properties and improve the performance of the RF processor.

In the above embodiment, main transmitter portion 404, DCO portion 406, auxiliary Cartesian transmitter portion 414, input combiner portion 416, main receiver portion 418, LNA portion 420, and auxiliary receiver portion 426 are components of RF processor 400. However, other embodiments include at least one of main transmitter portion 404, DCO portion 406, auxiliary Cartesian transmitter portion 414, combiner portion 416, main receiver portion 418, LNA portion 420, and auxiliary receiver portion 426 being a separate component within a system.

A second exemplary embodiment of the present invention differs from the embodiments described above in that the second exemplary embodiment includes a polar transmitter portion as the main transmitter portion in the RF processor. This embodiment will now be described in greater detail with respect to FIGS. 6, 8, 9 and 10A-B.

Figure 8:
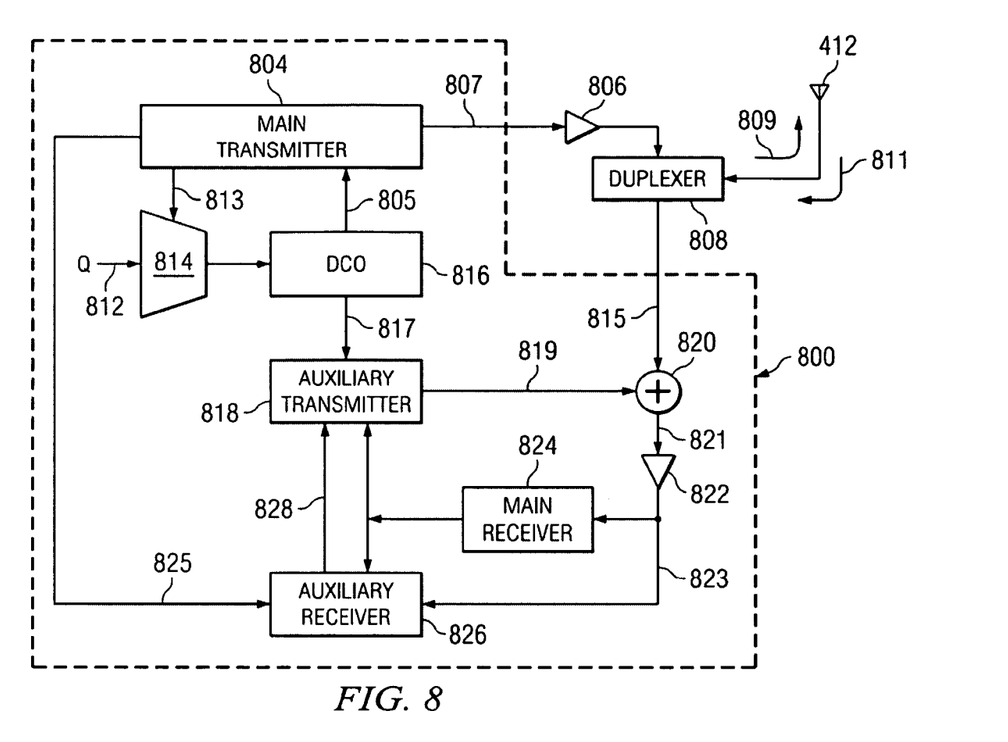
FIG. 8 illustrates an exemplary RF processor in accordance with another embodiment of the present invention.

Just as with the first embodiment, it is best to begin by describing a first mode of operation of the RF processor. An exemplary RF processor in accordance with this embodiment is shown in FIG. 8. In the first mode of operation, RF processor 800 is a fill duplex transceiver and thus is capable of transmitting and receiving data simultaneously using antenna 810. For simplicity of explanation, the transmit operation of RF processor 800 will be described first.

RF processor 800 includes a main polar transmitter portion 804, an auxiliary Cartesian transmitter portion 818, a DCO portion 816, an input combiner portion 820, an LNA portion 822, a main receiver portion 824, and an auxiliary receiver portion 826. In this embodiment, a power amplifier 806, an antenna 810, and a duplexer 808 are distinct from RF processor 800. However, in other embodiments, at least one of power amplifier 806, antenna 810, and duplexer 808 may be included in RF processor 800.

Main transmitter portion 804 receives as input, I component 801 and Q component 802 of the data to be transmitted as well as the cosine carrier wave 805, which is generated by DCO portion 816.

Cosine carrier wave 805 has a frequency corresponding to the output frequency of RF processor 800. Main transmitter portion 804 uses I component 801 and Q component 802 of the data to be transmitted to create a single output signal 825. Signal 825 is sent to auxiliary receiver portion 826 as well as used internally by main transmitter portion 804. Main transmitter portion 804 also uses I component 801 and Q component 802 of the data to be transmitted to create a phase-shift signal 813, which is output to a multiplexer 814. During the first mode of operation of RF processor 800, multiplexer 814 outputs phase-shift signal 813 to DCO portion 816 as the phase-shift component of the carrier waves generated by DCO portion 816.

Figure 9:
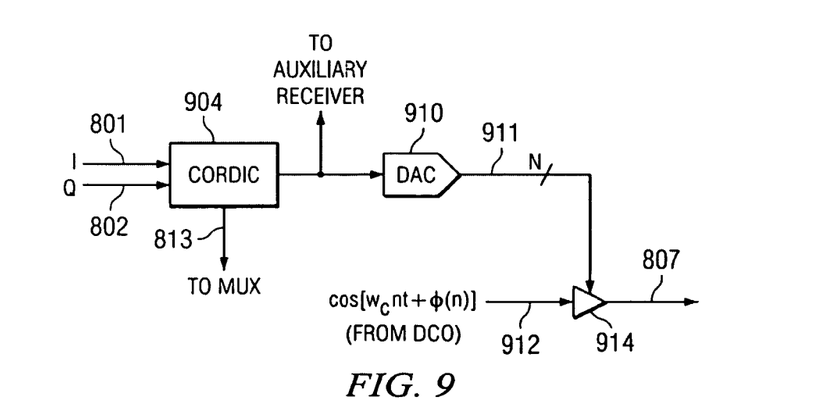
FIG. 9 illustrates an exemplary embodiment of a polar transmitter as used as the main transmitter portion of the RF processor in FIG. 8.

FIG. 9 illustrates an exemplary embodiment of main transmitter portion 804. As illustrated in FIG. 9, main transmitter portion 804 includes Coordinate Rotation Digital Computer (CORDIC) 904, DAC 910, and PPA 914.

I component 801 and Q component 802 of the data to be transmitted are interpreted by CORDIC 904, which converts I component 801 and Q component 802 of the data to be transmitted into output signal 825 and phase-shift signal 813. Output signal 825 is output to auxiliary receiver portion 826 and DAC 910. Object 811 represents multiple signal lines going from DAC 910 to PPA 914. The analog output of DAC 910 is converted to the output frequency of RF processor 800 by PPA 914 by mixing with cosine carrier wave 912 from DCO portion 816. The output from PPA 914 is used as the output signal 807 for RF processor 800.

Returning to FIG. 8, output signal 807 is output to powered amplifier 806, which increases the power of output signal 807 before being transmitted through antenna 810.

In the event that the amplified output signal 809 is sent through antenna 810 while an input signal 811 is received through antenna 810, duplexer 808 separates amplified output signal 809 and input signal 811. Input signal 811 separated by duplexer 808 is combined with a signal 819, which has been generated by auxiliary transmitter portion 818, by input combiner portion 820. The combined signal 821 output by input combiner portion 820 is amplified by LNA portion 822 and the combined amplified signal 823 is sent to main receiver portion 824 and auxiliary receiver portion 826.

Combined amplified signal 823 is then processed by main receiver portion 824 as shown in FIG. 6. As illustrated in FIG. 6, main receiver portion 824 includes signal processing unit 602, analog-to-digital converters (ADCs) 604 and 606, amplifiers 608 and 610, low-pass filters 609 and 611, and mixers 612 and 616.

Combined amplified signal 823 is sent to mixers 612, 616 to be separated into I component 613 and Q component 615. I component 613 is separated from combined amplified signal 823 by mixing combined amplified signal 823 with I carrier wave 614. Separated I component 613 is filtered by low-pass filter 609 and is amplified by amplifier 808 to improve the digital output for the following analog-to-digital converter (ADC) 604. Amplified I component 605 is converted to digital data by ADC 604, and is then sent to signal-processing unit 602.

Q component 615 is separated from combined amplified signal 823 by mixing combined amplified signal 823 with Q carrier wave 618. Separated Q component 615 is filtered by low-pass filter 611 and is amplified by amplifier 610 to improve the digital output for the following ADC 606. Amplified Q component 607 is converted to digital data by ADC 606, and is then sent to signal-processing unit 602. Signal-processing unit 602 processes I signal 601 and Q signal 603 to interpret the received data.

Returning to FIG. 8, in the first mode of operation of RF processor 800, amplified output signal 809 is strong enough to make complete separation of amplified output signal 809 and received signal 811 by duplexer 808 very difficult. As a result, some of amplified output signal 809 bleeds through duplexer 808 as interference in received signal 811. To compensate for the interference from amplified output signal 809, auxiliary receiver portion 826 compares combined amplified signal 821 to output signal 825 from main transmitter portion 804. Auxiliary receiver portion 826 then provides data 828 to auxiliary transmitter portion 818 in order to create signal 819, which in this mode of operation is an interference-canceling signal. Auxiliary transmitter portion 818 outputs interference-canceling signal 819 to input combiner portion 820. Input combiner portion 820 combines interference-canceling signal 819 with signal 815 from duplexer 808 to compensate for the interference from output signal 809 that is passed through duplexer 808 into signal 815.

The operation of auxiliary receiver portion 826 and auxiliary transmitter portion 818 to cancel the interference from amplified output signal 809 in the received signal 811 will now be described with reference to FIG. 10A.

Figure 10A:
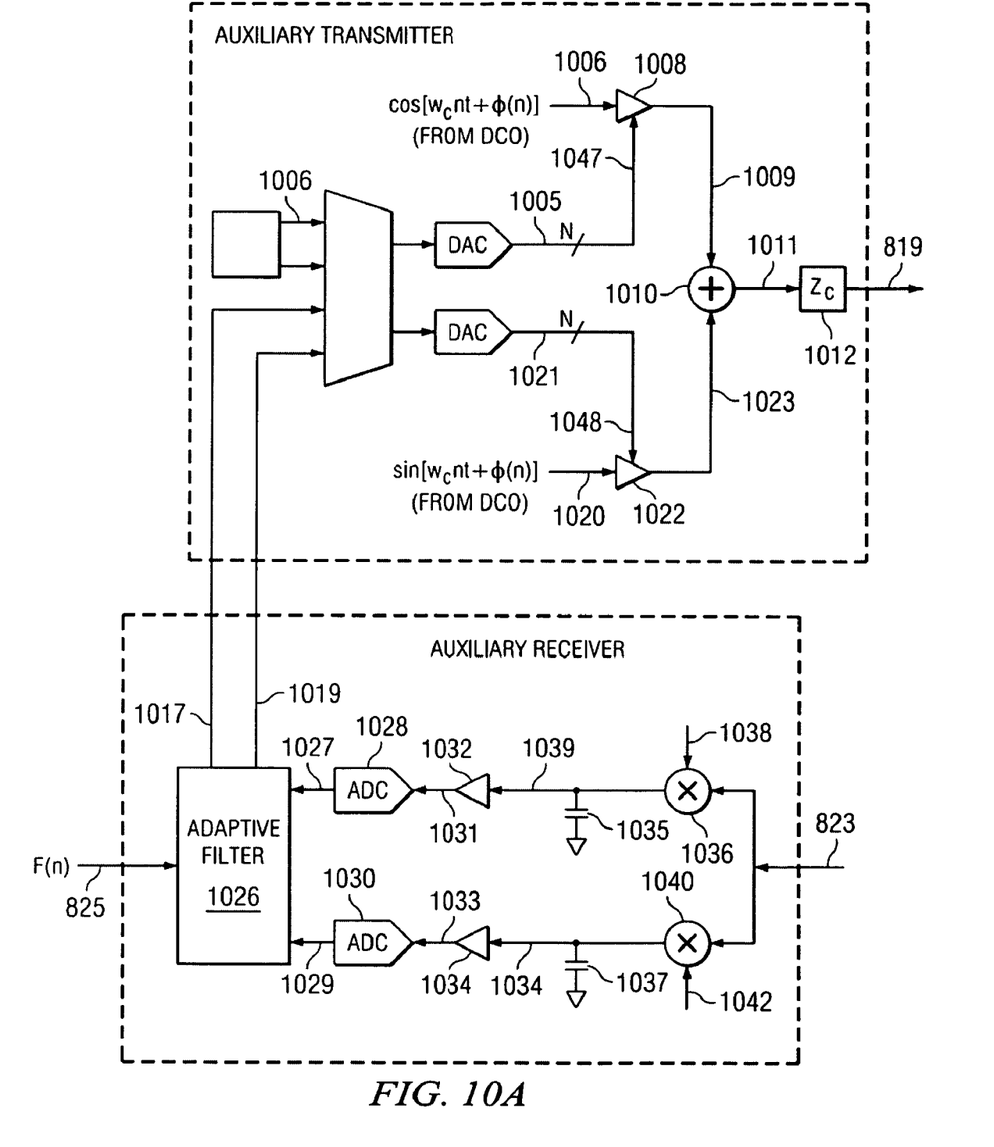
FIG. 10A illustrates a first mode of operation of the RF processor in FIG. 8.

As illustrated in FIG. 10A, auxiliary receiver portion 826 includes adaptive filter 1026, ADCs 1028 and 1030, amplifiers 1032 and 1034, low-pass filters 1035 and 1037, and mixers 1036 and 1040. Further, auxiliary transmitter portion 818 includes multiplexer 1002, DACs 1004 and 1018, PPAs 1008 and 1022, mixer 1011, and coupling impedance 1012.

Combined amplified signal 823 is sent to mixers 1036, 1040 to be separated into I component 1039 and Q component 1041. I component 1039 is separated from combined amplified signal 823 by mixing combined amplified signal 823 with I carrier wave 1038. Separated I component 1039 is filtered by low-pass filter 1035 and is amplified by amplifier 1032 to improve the digital output for the following ADC 1028. Amplified I component 1031 is converted to digital data by ADC 1028, and is then sent to an adaptive filter 1026.

Q component 1041 is separated from combined amplified signal 823 by mixing combined amplified signal 823 with Q carrier wave 1042. Separated Q component 1041 is filtered by low-pass filter 1037 and is amplified by amplifier 1034 to improve the digital output for the following ADC 1030. Amplified Q component 1033 is converted to digital data by ADC 1.030, and is then sent to adaptive filter 1026.

Adaptive filter 1026 compares I signal 1027 and Q signal 1029 to output signal 825. Adaptive filter 1026 then generates I data 1017 and Q data 1019, which auxiliary transmitter portion 818 uses to create signal 819 to cancel interference from amplified output signal 809.

I data 1017 and Q data 1019 are output to multiplexer 1002. Multiplexer 1002 sends I data 1017 to DAC 1004, which converts I data 1017 to analog signal 1005. Object 1047 represents a signal having a predetermined N-bit amplitude going from DAC 1004 to pre-power amplifier (PPA) 1008. Analog signal 1005 is converted to the output frequency of RF processor 800 by PPA 1008 by mixing with cosine carrier wave 1006 from DCO portion 816. The output 1009 from PPA 1008 is the I component of the interference-canceling signal and is sent to a combiner 1010.

Multiplexer 1002 additionally sends Q data 1019 to DAC 1018, which converts Q data 1019 to analog signal 1021. Object 1048 represents a signal having a predetermined N-bit amplitude going from DAC 1018 to PPA 1022. Analog signal 1021 is converted to the output frequency of RF processor 800 by PPA 1022 by mixing with sine carrier wave 1020 from DCO portion 816. The output 1023 from PPA 1022 is the Q component of the interference-canceling signal and is sent to combiner 1010 to be combined with I component 1009.

I component 1009 and Q component 1023 are combined by combiner 1010 to create interference-canceling signal 1011, which is then passed through coupling impedance 1012 before being sent as signal 819 to input combiner portion 820.

In the first mode of operation of RF processor 800, amplified output signal 809 is transmitted through antenna 810 while input signal 811 is received through antenna 810. In this first mode of operation, auxiliary receiver portion 826 and auxiliary transmitter portion 818 generate signal 819 to cancel interference in received signal 811 caused by amplified output signal 809.

In a second mode of operation, characteristics of the RF processor 800, including DC offset and I/Q imbalance correction, can be calibrated. At the beginning of the second mode of operation, the initial values of the properties that can be calibrated are output as original calibration data 827. In this mode of operation, multiplexer 814 uses zero signal 812 as phase-shift input to DCO portion 816 instead of phase-shift signal 813 generated by main transmitter portion 804.

Figure 10B:
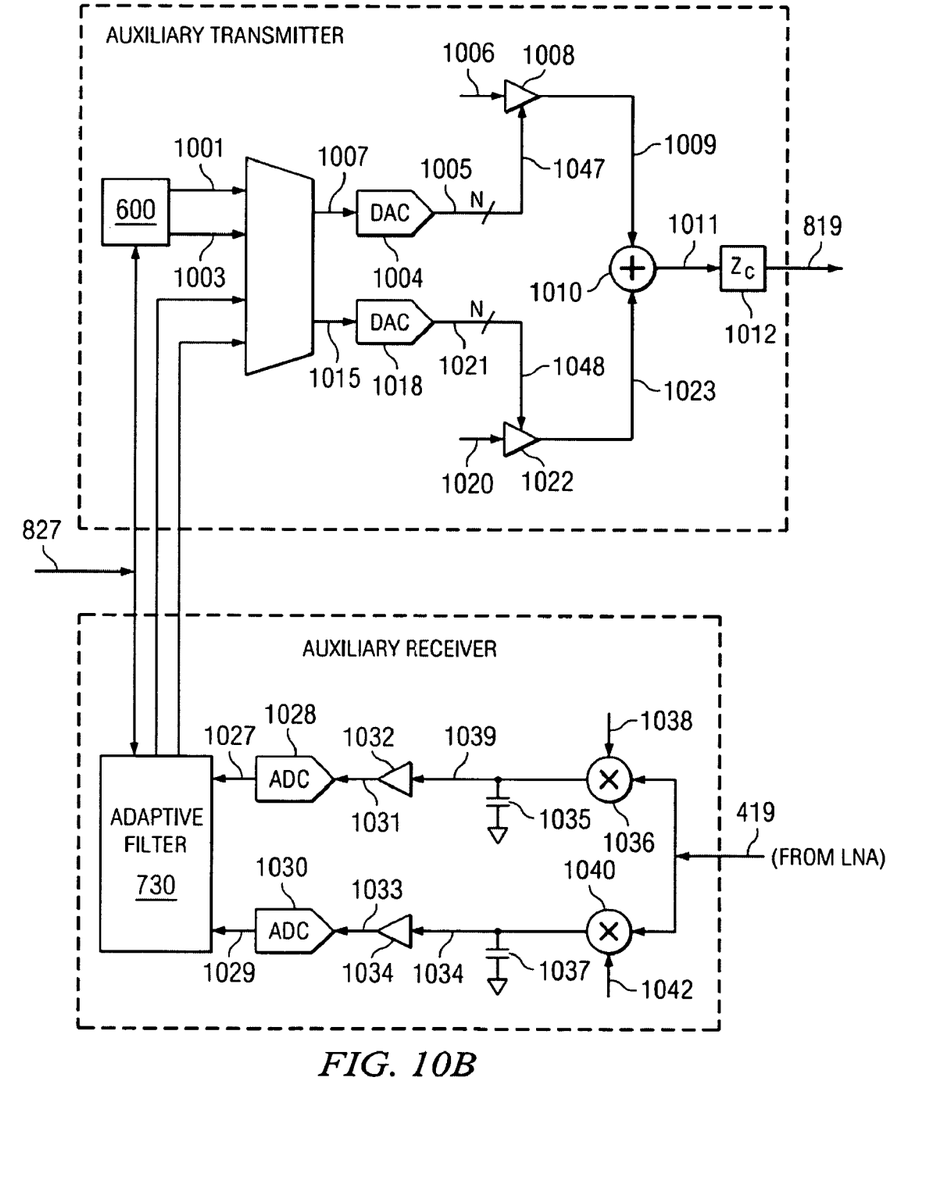
FIG. 10B illustrates a second mode of operation of the RF processor in FIG. 8.

Operation of exemplary auxiliary receiver portion 826 and auxiliary transmitter portion 818 in the second mode will now be described with reference to FIG. 10B. In addition to the components of auxiliary receiver portion 826 and auxiliary transmitter portion 818 as described above in reference to FIG. 10A, FIG. 10B adds calibration signal control unit 1000 to auxiliary transmitter portion 818.

A calibration signal may be based on current calibration data 827 from main receiver portion 824. Calibration signal control unit 1000 generates an I calibration signal 1001 and a Q calibration signal 1003 and signals 1001 and 1003 are output to multiplexer 1002. Multiplexer 1002 outputs signal 1001 as I calibration signal component 1007 and signal 1003 as Q calibration signal component 1015.

I calibration signal component 1007 is converted to analog signal 1005 by DAC 1004. Object 1047 represents a signal having a predetermined N-bit amplitude going from DAC 1004 to PPA 1008. Analog signal 1005 is converted to the output frequency of RF processor 800 by PPA 1008 by mixing with cosine carrier wave 1006 from DCO portion 816. The output 1009 is the I component of the calibration signal and is sent to combiner 1010.

Q calibration signal component 1015 is converted to analog signal 1015 by DAC 1018. Object 1048 represents a signal having a predetermined N-bit amplitude going from DAC 1018 to PPA 1022. Analog signal 1015 is converted to the output frequency of RF processor 800 by PPA 1022 by mixing with sine carrier wave 1020 from DCO portion 816. The output 1023 is the Q component of the calibration signal and is sent to combiner 1010 to be combined with the I component 1009.

Signal 1009 and signal 1023 are combined by combiner 1010 to create calibration signal 1011, which is then passed through a coupling impedance 1012 before being sent as signal 819 to input combiner portion 820.

Returning to FIG. 8, in the second mode of operation, signal 819 is a calibration signal and main transmitter portion 804 is not transmitting. Auxiliary transmitter portion 818 sends calibration signal 819 to input combiner portion 820 to be mixed with a blank receive signal 815. Combined signal 821 is then transmitted through LNA portion 822 before being sent as combined amplified signal 823 to auxiliary receiver portion 826 and main receiver portion 824.

The processing of a calibration signal by the main receiver portion 824 will now be described with reference to FIG. 6. Combined amplified signal 823 is sent to mixers 612, 616 to be separated into I component 613 and Q component 615. I component 613 is separated from combined amplified signal 823 by mixing combined amplified signal 823 with I carrier wave 614. Separated I component 613 is filtered by low-pass filter 609 and is amplified by amplifier 608 to improve the digital output for the following ADC 606. Amplified I component 605 is converted to digital data by ADC 604, and is then sent to signal-processing unit 602.

Q component 615 is separated from combined amplified signal 823 by mixing combined amplified signal 823 with Q carrier wave 618. Separated Q component 615 is filtered by low-pass filter 611 and is amplified by amplifier 610 to improve the digital output for the following ADC 606. Amplified Q component 607 is converted to digital data by ADC 606, and is then sent to signal-processing unit 602.

Signal-processing unit 602 processes the I signal 605 and Q signal 607 to: 1) detect overall gain of main receiver portion 824; 2) detect corner frequency of the filters of main receiver portion 824; 3) adjust the original calibration data of the DC offset for IIP2 calibration; and/or 4) adjust the original calibration data for I/Q imbalance. In the event that the IIP2 is calibrated or the I/Q imbalance needs correction, the adjusted calibration data 827 is then output to auxiliary receiver portion 826 and auxiliary transmitter portion 818.

When the calibration data for at least one RF processor property has been adjusted, the RF processor can either continue to calibrate RF processor properties or discontinue operation in the second mode of operation.

Exemplary methods of calibrating IIP2, calibrating I/Q imbalance, detecting overall receiver portion gain and detecting corner frequencies of analog filters of RF processor 800, all with the use of an internally generated signal, are similar to those discussed above with respect to RF processor 400. Specifically, as RF processor 800 differs from RF processor 400 only in the main transmitter portion, the methods of calibrating and detecting with the signal that is internally generated by the auxiliary transmitter portion are unaffected. For brevity of discussion, these exemplary methods of calibration and detection will therefore not be repeated with reference to RF processor 800.

In the second mode of operation of RF processor 800, signal 819 is a calibration signal generated by auxiliary transmitter portion 818 and is used to calibrate properties of RF processor 800 to improve the quality of received data interpreted by main receiver portion 823. This mode is designed to account for the variation in the performance of the device due to environmental conditions such as temperature and variation in the performance of the device due to the age or extended use of the device. The calibration signal 819 is used as a reference for the main receiver portion to adjust RF processor properties and improve the performance of the RF processor.

In the above embodiment, main transmitter portion 804, DCO portion 816, auxiliary transmitter portion 818, input combiner portion 820, main receiver portion 824, LNA portion 822, and auxiliary transmitter portion 826 are components of RF processor 800. However, other embodiments include at least one of main transmitter portion 804, DCO portion 816, auxiliary transmitter portion 818, input combiner portion 820, main receiver portion 824, LNA portion 822, and auxiliary transmitter portion 826 being a separate component within a system.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. A device for use with a transmission signal generator, a duplexer and an antenna, the transmission signal generator being operable to generate a transmission signal, the duplexer being operable to provide a transmit signal to the antenna, the antenna being operable to transmit the transmit signal, to receive a reception signal and to provide the reception signal to the duplexer, the duplexer being further operable to separate the transmit signal from the reception signal and to generate a duplexed signal, said device comprising:
   a first transmitter operable to generate an output signal based on the transmission signal;
   a second transmitter operable to generate a modifying signal; and
   a receiver having a second order intercept point and being operable to receive a third signal, said receiver comprising an I channel, a Q channel and a processing portion, said processing portion being operable to calibrate the second order intercept point and to compensate for I/Q imbalance between said I channel and said Q channel,
   wherein the third signal is based on the modifying signal.

2. The device of claim 1,
   wherein said receiver has a gain G, and
   wherein said receiver processing portion is further operable to measure the gain G via the modifying signal.

3. The device of claim 1,
   wherein said receiver further comprises a filter, wherein said filter has a corner frequency, and wherein said processing portion is further operable to measure the corner frequency via the modifying signal.

4. The device of claim 1, wherein said I channel comprises a first mixer, and wherein said first mixer is operable to generate a first DC offset based on the modifying signal.

5. The device of claim 4, wherein said Q channel comprises a second mixer, and wherein said second mixer is operable to generate a second DC offset based on the modifying signal.

6. The device of claim 1, wherein said processing portion comprises an adaptive filter, and wherein said adaptive filter is operable to compensate for I/Q imbalance based on the calibration signal.

7. The device of claim 6, wherein said receiver is further operable to receive the reception signal, and wherein said adaptive filter is further operable to compensate for the I/Q mismatch based on the reception signal.

8. The device of claim 1, further comprising a main receiver operable to receive a fourth signal based on the duplexed signal.

9. The device of claim 8, wherein when said first transmitter comprises a Cartesian transmitter.

10. The device of claim 8, wherein when said first transmitter comprises a polar transmitter.

11. A method of using a transmission signal generator, a duplexer and an antenna, the transmission signal generator being operable to generate a transmission signal, the duplexer being operable to provide a transmit signal to the antenna, the antenna being operable to transmit the transmit signal, to receive a reception signal and to provide the reception signal to the duplexer, the duplexer being further operable to separate the transmit signal from the reception signal and to generate a duplexed signal, said method comprising:

generating, via a first transmitter, an output signal based on the transmission signal;

generating, via a second transmitter, a modifying signal;

receiving a third signal, via a receiver having a second order intercept point and comprising an I channel, a Q channel and a processing portion;

calibrating the second order intercept point, via the processing portion; and compensating, via the processing portion, for I/Q imbalance between the I channel and the Q channel, wherein the third signal is based on the modifying signal.

12. The method of claim 11, further comprising measuring a gain G of the receiver via the processing portion based on the modifying signal.

13. The method of claim 12, further comprising:

measuring via the modifying signal, wherein said receiving comprises receiving via the receiver that further comprises a filter having a corner frequency, and wherein said measuring comprises measuring the corner frequency via the modifying signal.

14. The method of claim 11, further comprising:

generating, via the second transmitter, a calibration signal, and generating a first DC offset in the receiver based on the calibration signal.

15. The method of claim 14, further comprising generating a second DC offset in the receiver based on the continuous calibration signal.

16. The method of claim 11, further comprising:

generating, via the second transmitter, a calibration signal, and compensating for I/Q mismatch based on the calibration signal.

17. The method of claim 16, wherein said receiver is further operable to receive the reception signal, and wherein said adaptive filter is further operable to compensate for I/Q mismatch based on the reception signal.

18. The method of claim 11, further comprising:

receiving a fourth signal, via main receiver, wherein the fourth signal is based on the duplexed signal.

19. The method of claim 18, wherein said generating an output signal comprises generating an output signal via a polar transmitter.

* * * * *